United States Patent [19]

Grund

[11] Patent Number: 4,951,376

[45] Date of Patent: Aug. 28, 1990

[54] MACHINE TOOL

[75] Inventor: Peter Grund, Rieden, Fed. Rep. of Germany

[73] Assignee: Maho Aktiengesellschaft, Pfronten, Fed. Rep. of Germany

[21] Appl. No.: 436,306

[22] Filed: Nov. 14, 1989

[30] Foreign Application Priority Data

Nov. 14, 1988 [DE] Fed. Rep. of Germany ... 8814245[U]

[51] Int. Cl.$^5$ ....................... B23Q 3/155; B23Q 41/04
[52] U.S. Cl. ..................................... 29/568; 29/27 C; 29/563; 29/564; 82/121; 82/149; 409/235
[58] Field of Search .............. 29/564, 568, 56.5, 27 R, 29/27 A, 27 C, 563, 56.5, 35.5, 36, 39, 50; 409/240, 235; 82/120, 121, 149

[56] References Cited

U.S. PATENT DOCUMENTS 4,571,796 2/1986 Sellner et al. ..................... 29/568 X
4,719,676 1/1988 Sansone ............................... 29/27 A
4,785,525 11/1988 Ishida et al. ........................... 29/568

Primary Examiner—Steven C. Bishop
Attorney, Agent, or Firm—Baker, Maxham, Jester & Meador

[57] ABSTRACT

A machine tool consisting of a stand for a spindle case which travels along the horizontal Z-axis and the vertical Y-axis, with at least one horizontal working spindle and a non-deformable bed with guides for workpiece bench traveling horizontally along the X-axis. To allow simultaneous milling and lathe work on several workpieces, the machine tool comprises a complete milling unit, and next to it on the machine bed, a complete lathe unit. To the side of the workpiece bench of the milling unit, an independent, rotation driven device is placed within the guides of the bed for clamping horizontally aligned workpieces, and next to it a turret head upon which turning tools are secured.

12 Claims, 1 Drawing Sheet

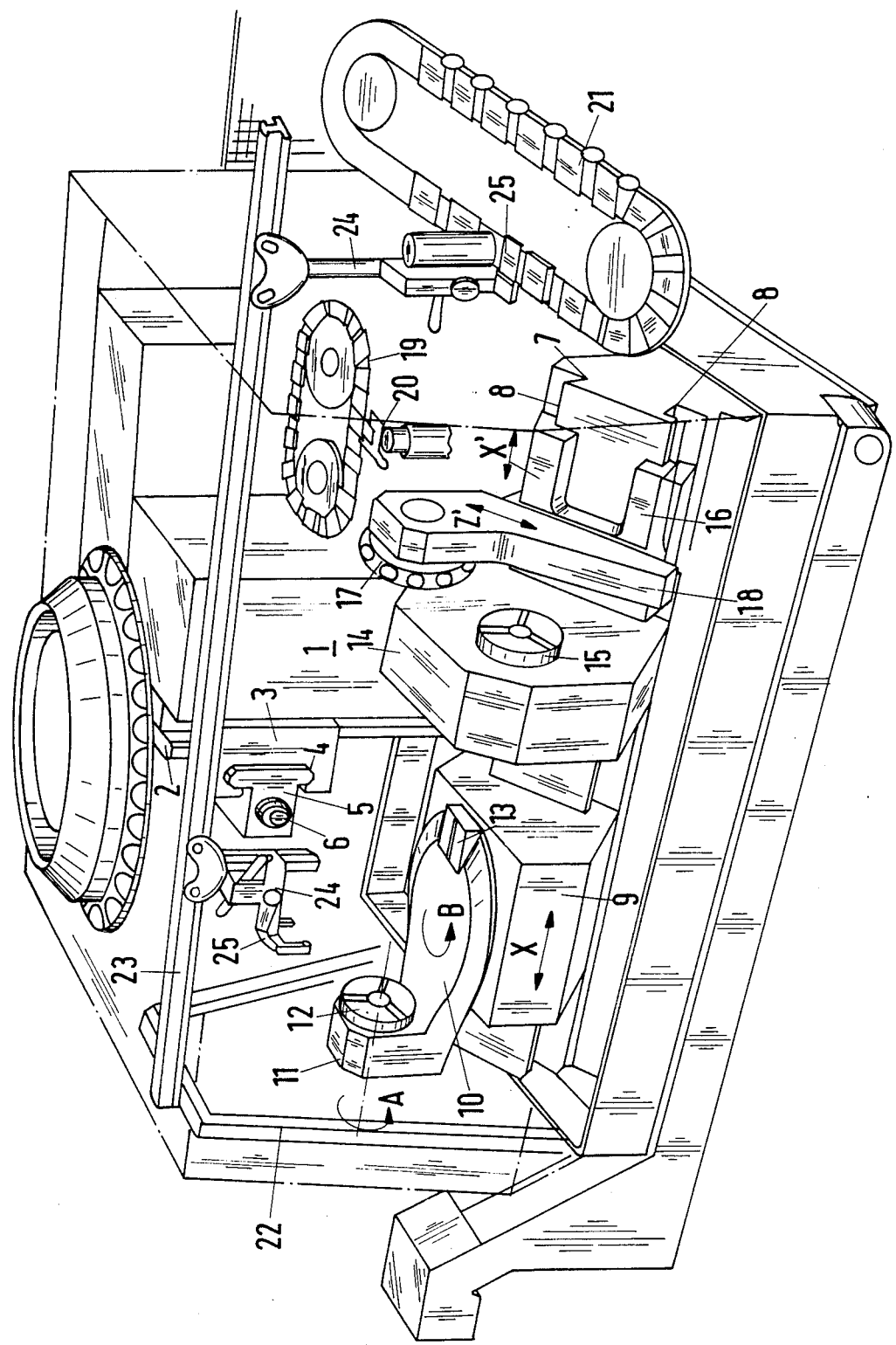

MACHINE TOOL

FIELD OF THE INVENTION

The invention relates to machine tools for performing milling and lathe work on workpieces, and, more particularly, consists of a stand for a spindle case which travels along the horizontal Z-axis and the vertical Y-axis, with a horizontal working spindle, and also consists of a non-deformable bed with guides for a workpiece bench lathe traveling along the horizontal X-axis.

BACKGROUND OF THE INVENTION

According to experiences of users of complex machine tools, a large number of workpieces have to be milled and lathed. This is done on separate and complete milling machines and lathes with individual program controls. Apart from the necessarily high expense, it can be difficult to optimally combine various machine types in order to achieve a flexible working process.

In addition, there are work centers which can alternatively mill or lathe a piece in one clamping. These machines, however, are either milling machines with supplementary attachments for lathe work, or lathes with milling attachments. Such attachments are naturally not as powerful as the machine's primary units, which in turn limits its usage to specific workpieces. Moreover, parallel milling or lathe work on separate workpieces is not possible.

SUMMARY OF THE INVENTION

It is a primary purpose of this invention to create a machine tool which will allow parallel milling and lathe work of two workpieces.

The invention accomplishes this purpose by providing guidelines within the bed next to the workpiece bench for milling with a unit for lathe work. This unit contains an independent rotation driven device to clamp horizontally positioned workpieces and a separate turret head upon which turning tools are secured which travel individually along the guides within the bed.

The machine tool according to the invention is a union of a complete milling machine and a lathe, and allows for parallel and simultaneous handling of two different workpieces while using only one continuous machine bed.

One particular advantage of the machine tool according to the invention is that instead of having an additional unit for lathe work, other units such as grinding or laser units or similar ones can be installed on the machine bed. The provision of laser units makes it especially possible to carry out particular working processes on the workpiece while it is also clamped into the workbench of the milling unit.

The workpieces are fed into the milling and lathe units by separate devices, in particular, and by way of example, by a pallet changer for the milling unit and by a chain magazine for the lathe unit. According to a particularly effective design of the invention, the milling and lathe units can be fed by one common workpiece magazine or workpiece store. This is carried out by means of a transfer mechanism consisting of traveling workpiece tongs which services the milling as well as the lathe unit. In addition to this a tool magazine is provided for both the milling and lathe units.

BRIEF DESCRIPTION OF THE DRAWING

The objects, advantages and features of this invention will be more fully perceived from the following detail of description, when read in conjunction with the accompanying single drawing figure which is a pictorial view of the internal mechanism of a machine tool constructed in accordance with the invention.

DESCRIPTION OF THE PREFERRED EMBODIMENT

The depicted machine tool contains rigid pedestal 1 with vertical guides 2 on a side wall to support console 3. Horizontal guides 4 are provided in console 3 in which travels spindle casing 5 with horizontal spindle 6.

Rigid machine bed 7 is placed in front of the pedestal and contains continuous lengthwise guides 8 on its forward sloping surface. Table arm 9 is installed at the left side of bed 7 so that it travels within the lengthwise guides along the horizontal X-axis. This table arm carries on its horizontal top workpiece bench 10 which is rotatable around the vertical B-axis. This workpiece bench contains on one side fitted retaining block 11 with horizontal slots and clamping devices 12 for the fastening of a rotationally symmetric workpiece with a horizontal axis rotating about the A-axis. In the retaining block are drives (not depicted) for rotating the clamping devices arranged around the horizontal axis. At the diametrically opposite side of workpiece bench 10 is assembly platform 13 for the fastening of an arm bracket (not shown) for supporting longer workpieces clamped in clamping devices 12.

Next to table arm 9 block 14 is installed, also traveling along the X-axis on guides 8 of bed 7 with an integrated drive (not depicted) for workpiece holding and rotating device 15. To the side of block 14 is console 16 traveling along guides 8. On top of the console, turret head 17 is held by means of support beam 18 traveling in the direction of double arrow Z. Turret head 17 is provided with tool magazine 19 and tool exchanger 20.

Magazine 21 on one of the front sides of the machine is provided to feed workpiece bench 10 of the milling unit and clamping or holding device 15 in block 14 of the lathe unit.

A workpiece transfer device consists of frame 22, depicted only on the left side, and horizontal guide rail 23, which runs above magazine 21 of lathe unit 14, 17 and milling unit 10, 12. Tongs 24 are installed on this guide rail, fingers 25 of which can extend vertically downward and grab a workpiece as depicted on the right side of the figure. The tongs with the fingers are movable about several axes as may be necessary for proper grabbing and transferring workpieces between the magazine and the work stations. The fingers are movably attached to the tongs and the guide rail so as to allow the clamping of workpieces on lathe bench 10, in workpiece block 11, as well as in the clamping devices of block 14.

In view of the above description, it is likely that modifications and improvements will occur to those skilled in the art which are within the scope of the appended claims.

What is claimed is:

1. A machine tool comprising:
   a frame;
   a spindle case having means for mounting and rotating at least one machine tool by means of a working spindle;

a pedestal mounted to said frame, said spindle case being mounted to said pedestal for mutually perpendicular horizontal and vertical movement with respect thereto;

a rigid machine tool bed having linear guides thereon;

a workpiece bench mounted for movement along said linear guides to position workpieces for milling by means of tools in said working spindle; and a lathe work unit mounted for movement along said linear guides and normally spaced from said workpiece bench, said lathe work unit comprising:

means for retaining and rotating a workpiece;

console means mounted for independent movement along said linear guides; and a tool turret head to which turning tools are removably secured for providing lathe work to the workpieces retained by said retaining and rotating means.

2. The machine tool recited in claim 1, wherein said tool bed on which said linear guides are mounted is arranged at an angle with respect to the horizontal.

3. The machine tool recited in claim 1, and further comprising:

a tool magazine having tools for interchanging with tools in said tool turret; and a tool interchanger associated with said tool magazine, said tool interchanger being adapted to exchange tools between said tool turret and said tool magazine.

4. The machine tool recited in claim 2, and further comprising:

a tool magazine having tools for interchanging with tools in said tool turret; and a tool interchanger associated with said tool magazine, said tool interchanger being adapted to exchange tools between said tool turret and said tool magazine.

5. The machine tool recited in claim 1, and further comprising:

a workpiece magazine;

means for selectively transferring workpieces between said workpiece magazine to said workpiece bench and to said lathe work unit.

6. The machine tool recited in claim 2, and further comprising:

a workpiece magazine;

means for selectively transferring workpieces between said workpiece magazine to said workpiece bench and to said lathe work unit.

7. The machine tool recited in claim 3, and further comprising:

a workpiece magazine;

means for selectively transferring workpieces between said workpiece magazine to said workpiece bench and to said lathe work unit.

8. The machine tool recited in claim 4, and further comprising:

a workpiece magazine;

means for selectively transferring workpieces between said workpiece magazine to said workpiece bench and to said lathe work unit.

9. The machine tool recited in claim 5, said transferring means comprising:

a frame;

a horizontal guide rail mounted to said frame; and transfer means comprising tongs with movable fingers mounted for linear movement along said horizontal guide rail, said transfer means being movable about several axes and being adapted to selectively engage a workpiece and transfer it between said workpiece magazine, said workpiece bench and said lathe work unit.

10. The machine tool recited in claim 6, said transferring means comprising:

a frame;

a horizontal guide rail mounted to said frame; and transfer means comprising tongs with movable fingers mounted for linear movement along said horizontal guide rail, said transfer means being movable about several axes and being adapted to selectively engage a workpiece and transfer it between said workpiece magazine, said workpiece bench and said lathe work unit.

11. The machine tool recited in claim 7, said transferring mean comprising:

a frame;

a horizontal guide rail mounted to said frame; and transfer means comprising tongs with movable fingers mounted for linear movement along said horizontal guide rail, said transfer means being movable about several axes and being adapted to selectively engage a workpiece and transfer it between said workpiece magazine, said workpiece bench and said lathe work unit.

12. The machine tool recited in claim 8, said transferring means comprising:

a frame;

a horizontal guide rail mounted to said frame; and transfer means comprising tongs with movable fingers mounted for linear movement along said horizontal guide rail, said transfer means being movable about several axes and being adapted to selectively engage a workpiece and transfer it between said workpiece magazine, said workpiece bench and said lathe work unit.

* * * * *